(No Model.)
E. B. MEYROWITZ.
EYEGLASSES.
No. 469,437. Patented Feb. 23, 1892.
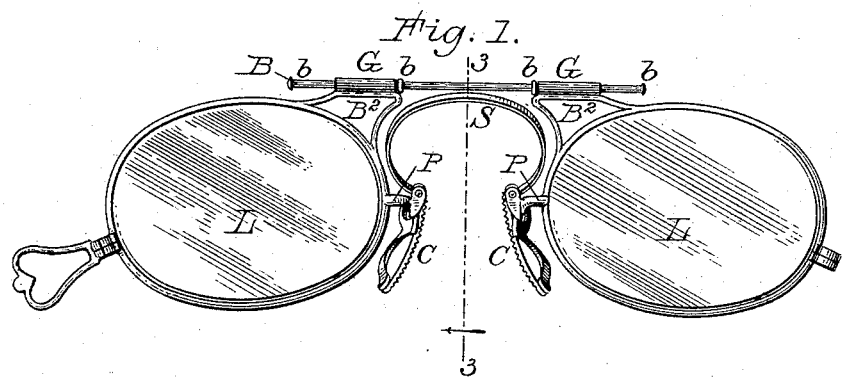
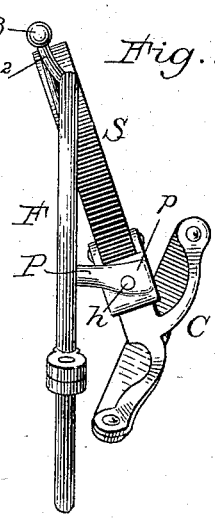
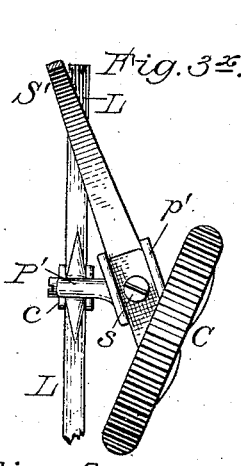
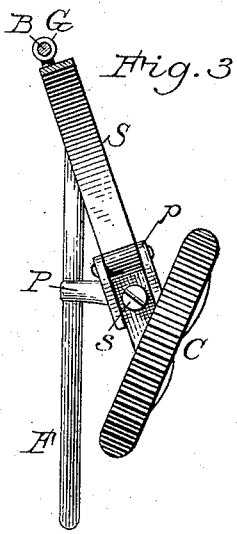
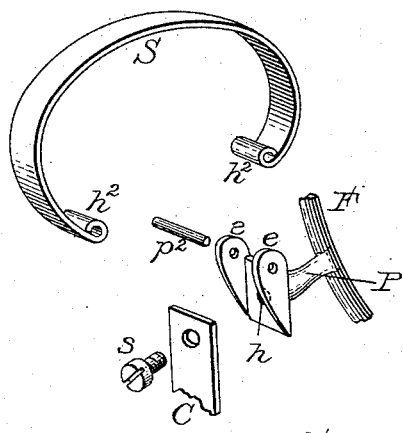
Attest:
Howell Bartle
Geo. W. Whitney
Inventor:
Emil B. Meyrowitz.
By his Attorney

UNITED STATES PATENT OFFICE.

EMIL B. MEYROWITZ, OF RIDGEFIELD, NEW JERSEY.

EYEGLASSES.

SPECIFICATION forming part of Letters Patent No. 469,437, dated February 23, 1892.

Application filed June 2, 1891. Serial No. 394,843. (No model.)

*To all whom it may concern:*

Be it known that I, EMIL B. MEYROWITZ, a citizen of the United States, and a resident of Ridgefield, in the State of New Jersey, having my place of business at the city of New York, have invented a new and useful Improvement in Eyeglasses, of which the following is a specification.

This invention is in part additional to my improvement in eyeglasses patented August 16, 1887, by Letters Patent No. 368,226; and it consists in novel means whereby a bowed spring of ordinary or improved make may be attached to the lenses or their frames, so as to slant forward without the interposition of anything for this purpose between the spring and the posts, and so that the lower ends of the spring are set back relatively to the vertical plane of the lenses, the spring need not project so far in front of the lenses, and the patented clips with bifurcated pliable connections or any ordinary or improved clips that are suitable may also be so attached as to support the lenses as far away from the eyes as may be required.

The present invention further consists in a novel "sliding-bar spring" combination, locating the greatest tension of the spring substantially in line with the horizontal or central axis of the lenses, and at the same time adapted to have a relatively light and ornate sliding bar to effectively control the lateral movement of the lenses relatively to each other, so that such movements shall not disturb the relation of the respective lenses with reference to each other and to the clips or their nose-pieces.

A sheet of drawings accompanies this specification as part thereof.

Figure 1 of the drawings is a front view of a pair of bar-spring eyeglasses embodying the several features of my invention. Fig. 2 is a magnified end view of the same. Fig. 3 is a magnified view in the same direction from the plane of section indicated at 3 3, Fig. 1. Fig. $3^\times$ is a fragmentary view corresponding with a portion of Fig. 3, illustrating certain modifications; and Fig. 4 is a perspective view of the bowed spring and its connections with one of the lens-frames represented in Figs. 1, 2, and 3.

Like letters of reference indicate corresponding parts in the several figures.

With any pair of lenses L L, and preferably with a pair of my patented clips C C, as represented at Fig. 7 in said Letters Patent No. 368,226, and with a forwardly-slanting bowed spring S or S′, of any approved shape and material, I now combine certain peculiar posts P P′ and a peculiarly-attached sliding bar B, either or both, as hereinafter more particularly described. Said posts P and P′ project rearwardly or toward the eyes, substantially at right angles to the plane of the lenses, as best seen in Figs. 2, 3, and $3^\times$, and are provided at their rear ends in common with means for attaching thereto the lower ends of the bowed spring S or S′ and the shanks of the clips C. In both arrangements these means include flanged face-plates $p$ $p'$, rigidly united with the posts and set fixedly at the proper angle for the spring, so that the forward inclination of the spring is determined by simply attaching its ends to the respective face-plates without the aid of any interposed pliable connection or the like. In both arrangements the rear ends of the posts, together with their face-plates, are further provided with screw-holes $h$, Figs. 2 and 4, to receive the threaded ends of screws $s$, which serve, in connection with the flanges of said face-plates $p$ $p'$, to readily attach the clips C C′ in the customary manner.

In the eyeglasses represented in Figs. 1, 2, 3, and 4 the flanged face-plates $p$ of the posts P have perforated ears $e$, Fig. 4, and the ends of the spring S terminate in corresponding hinge-barrels $h^2$, through which pintles $p^2$, Fig. 4, are inserted to unite the parts. Thus attached the bowed spring does not resist the controlling effect of the bar B, and as the function of the latter is solely to render the lateral movements of the lenses rectilinear it may be quite light, as represented, and simply provided with neat stops $b$ to limit such lateral movements. Between the pair of said stops $b$ at its respective ends the bar is embraced by tubular guides G, Figs. 1 and 3, which are rigidly united by skeleton brackets $B^2$, Figs. 1 and 2, with metallic lens-frames F, which may be otherwise of any approved description. The posts P are likewise rigidly united with the lens-frames F by welding, brazing, or soldering, and may preferably be made of the same metal as the frames.

In the modified eyeglasses represented by Fig. 3ˣ the posts P' are attached to frameless lenses L by clamps $c$, which may be of any ordinary or improved form, and the bowed spring S' is rigidly attached to the angular face-plates $p'$ by the screws $s$, which attach the clips C in a customary manner. Other like modifications will suggest themselves to those skilled in the art.

Having thus described the said eyeglasses, I claim as my invention and desire to patent under this specification—

1. In eyeglasses having a pair of lenses united by a bowed spring and supported wholly upon the nose of the wearer, the combination, with the lenses, spring, and clips, of posts projecting rearwardly or toward the eyes, substantially as shown and described.

2. In eyeglasses having a pair of lenses united by a forwardly-slanting bowed spring and supported wholly upon the nose of the wearer, the combination, with the lenses, spring, and clips, of posts provided with angularly-arranged face-plates having flanges parallel with each other between which the ends of the spring are attached, whereby the spring is given the desired inclination, substantially as shown and described.

3. The combination, in eyeglasses, of lens-frames, elevated bar-guides and posts rigidly attached to said frames, a bowed spring and suitable clips attached to said posts, and a sliding bar having its respective ends loose in said guides and provided with stops, substantially as shown and described.

4. In combination with the lenses, bar-guides, sliding bar, and suitable connections, a bowed spring having hinge-barrels at its respective extremities, posts having perforated ears matching the same, and pintles uniting these parts, substantially as shown and described.

E. B. MEYROWITZ.

Witnesses:
   JAS. L. EWIN,
   GEO. M. WHITNEY.